United States Patent
Babbs

[15] 3,685,872
[45] Aug. 22, 1972

[54] SLIDE FOR A VEHICLE SEAT

[72] Inventor: Frederick William Babbs, Nottingham, England

[73] Assignee: Cox of Watford Limited, Nottingham, England

[22] Filed: Nov. 19, 1969

[21] Appl. No.: 878,043

[52] U.S. Cl. ................ 308/6 R, 74/533, 248/430, 297/216
[51] Int. Cl. ....... F16c 29/00, B60r 21/10, G05g 5/06
[58] Field of Search ............. 74/533; 308/6; 248/430; 297/216

[56] References Cited

UNITED STATES PATENTS

| | | | |
|---|---|---|---|
| 2,271,913 | 2/1942 | Crabb | 248/430 |
| 2,351,778 | 6/1944 | Moulding | 248/430 |
| 2,713,384 | 7/1955 | Rosenberg | 248/430 |
| 3,394,912 | 7/1968 | Bullen | 248/430 |
| 3,524,677 | 8/1970 | Louten, Jr. | 297/216 |
| 3,552,795 | 1/1971 | Perkins et al. | 297/216 |
| 2,127,610 | 8/1938 | Moore | 74/533 X |
| 2,139,174 | 12/1938 | Saunders | 74/533 X |
| 3,013,763 | 12/1961 | Weberman | 308/6 X |
| 3,450,425 | 6/1969 | Leonhardt | 74/533 X |

Primary Examiner—Martin P. Schwadron
Assistant Examiner—Barry Grossman
Attorney—Watson, Cole, Grindle & Watson

[57] ABSTRACT

This invention is a fore and aft adjustable seat slide for a motor car seat in which balls act between the sides of respective channel members so that the tops of the channel members do not co-operate with the balls and are free for fixing means for the channels and for deformation to give good surface-to-surface contact between the channels under the excessive loads experienced in a crash.

14 Claims, 6 Drawing Figures

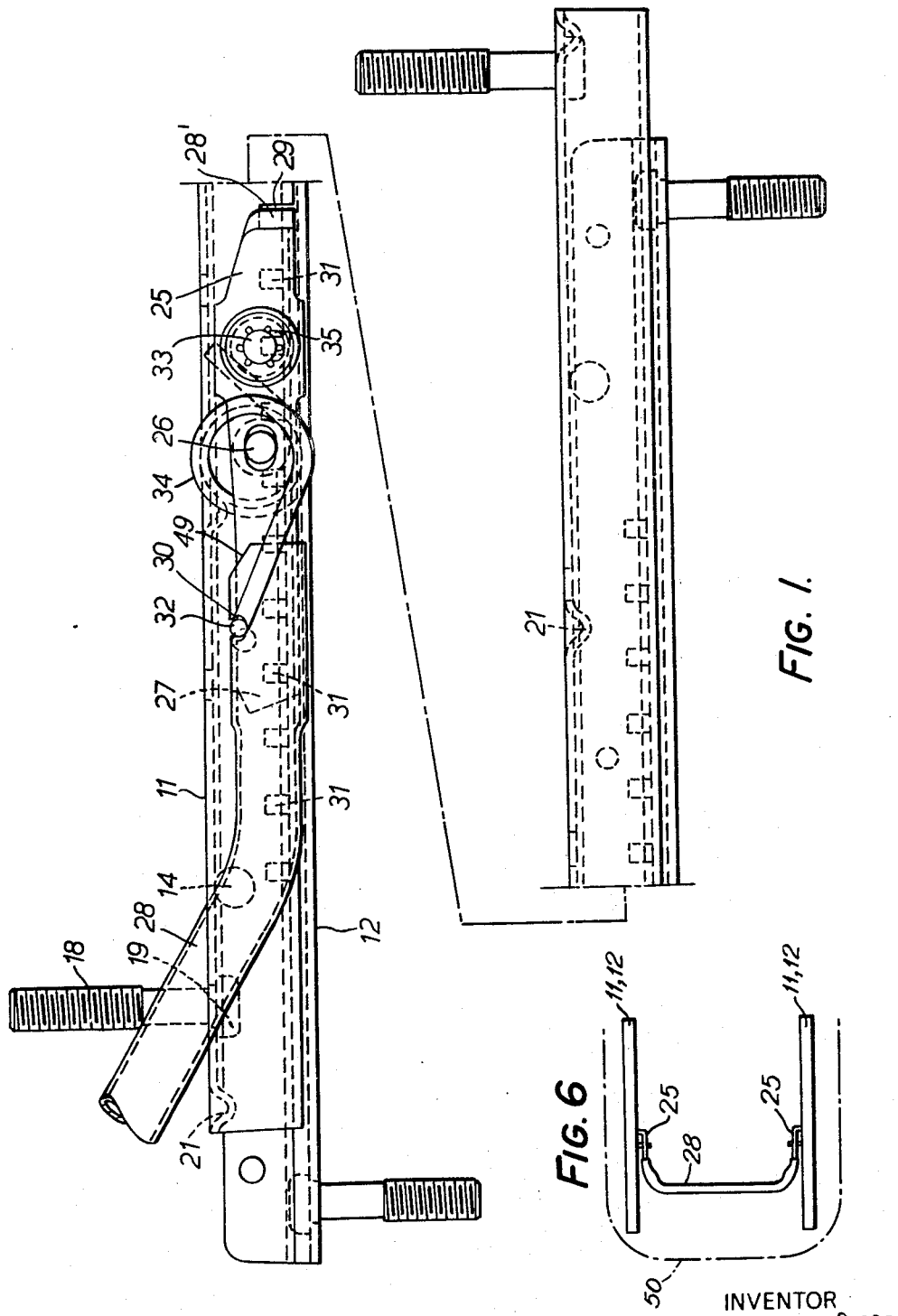

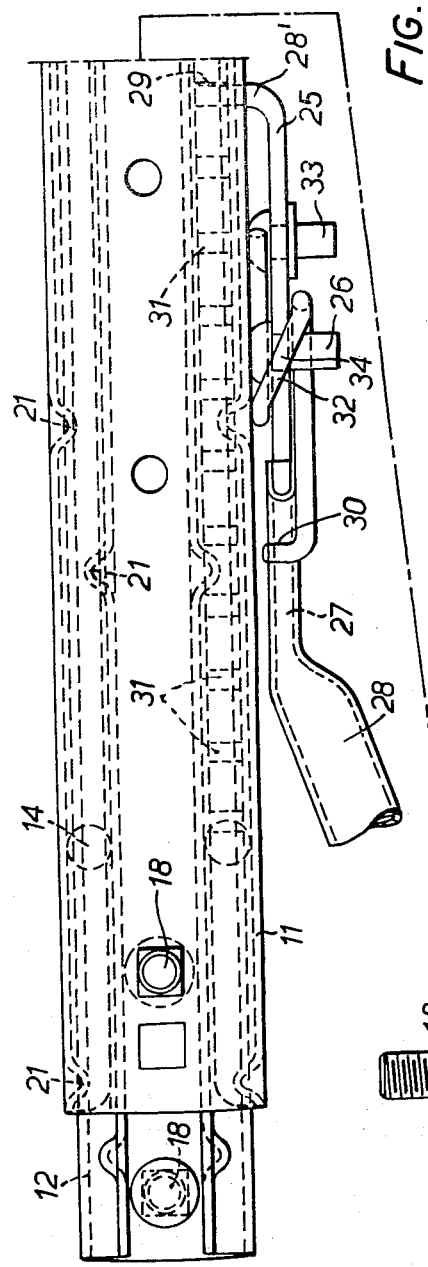
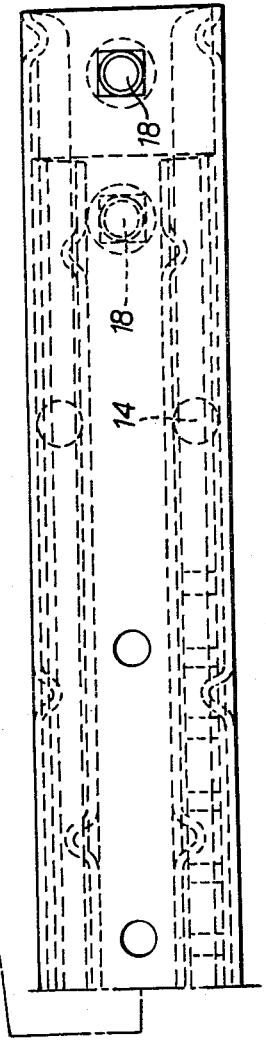
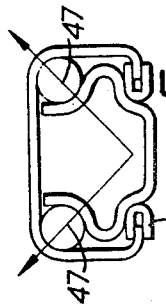
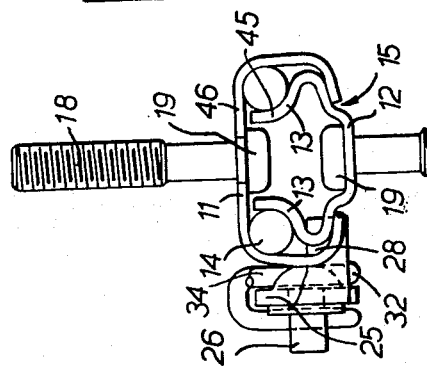
INVENTOR
FREDERICK WILLIAM BABBS
BY
Watson, Cole, Grindle & Watson
ATTORNEY

SLIDE FOR A VEHICLE SEAT

This invention relates to a fore and aft slide for a vehicle seat for enabling the user to adjust the fore and aft position of the seat in the vehicle.

According to the present invention the slide includes relatively slidable channels and at least one ball or roller operating between corresponding surfaces of the channels at the sides to leave the center part of the top and/or bottom free from contact with the balls. One advantage is that the top and bottom are available for fixing means which will not interfere with the ball or roller.

In the past balls have roller in a central track between the top and bottom of the slides and between the two sides of the inner channel and then the limits of fore and aft movement have been determined by contact of the balls with bolts in the central track used for fixing the channels respectively to the seat and the vehicle floor. This has been a limiting factor on design and by separating the balls or rollers from the fixing means it has been possible to choose the limits of fore and aft slide at the time the slide is being fitted to the vehicle by drilling bolt holes in appropriate positions in the top and bottom of the channels.

Another advantage is that under abnormal loads, the channels can be arranged to deform to transfer the point contact between balls and channels into continuous line contact between channels along the length of the slide.

In the preferred form of the invention the balls are in races defined by corresponding angles of the channel sections so that the line of thrust through a ball from channel to channel is inclined both to the horizontal and the vertical.

The balls provide location between the channels in both horizontal and vertical directions under normal conditions.

The channels may have stops co-operating with the balls to define limiting positions of the slide.

There can be a series of notches for a locking detent arranged along the full length of the inner channel since this can be in a part of the channel itself not used for defining a ball race.

A releasable latch for locking the slide in a chosen position of fore and aft adjustment could be arranged to pivot about a pin fixed to a wall of one channel.

The invention may be carried into practice in various ways and one embodiment and some modifications will be described by way of example with reference to the accompanying drawings, in which:

FIG. 1 is a side elevation of a fore and aft seat slide for a motor car embodying the invention;

FIG. 2 is a plan view corresponding to FIG. 1;

FIG. 3 is an end view corresponding to FIG. 1;

FIGS. 4 and 5 are views corresponding to FIG. 3 showing possible modifications of the sliding surfaces; and FIG. 6 is a schematic showing of the assembled slide.

As shown in FIGS. 1, 2 and 3 the fore and aft slide includes sheet steel outer and inner channels 11 and 12 of which the first is to be secured to the underside of a seat while the second is to be secured to the floor of the vehicle. The inner channel 12 has its side inwardly curved as shown at 13 in FIG. 3 to define with the corners of the outer channel 11 longitudinal races for steel balls 14. Thus the seat can be moved forwardly and rearwardly in relation to the floor by rolling of the balls with substantially rolling point or line contact between the balls and the channels. There may be sliding at the opposite sides of the channels as shown at 15 and the surfaces may be lightly greased or have plastic interlayers 16 or 17 fitted as indicated in FIGS. 4 and 5. Such plastic layers also make the slide quieter. Alternatively it can be arranged that the weight of the average occupant is sufficient to cause the inner section track flanges to close inwards within the material's elastic modulus which in turn will provide a gap between the two channel surfaces at 15 so that there is no relative sliding there. The sections may also be assembled with a pre-load in the ball track flanges to avoid rattle when the seat is empty.

By providing races for the balls 14 between the co-operating sides of the channels 11 and 12 the central region between the sides of the inner channel 12 is left unobstructed for fixing bolts 18 for securing the channels respectively to the seat and to the floor, and the heads 19 of such bolts do not limit the amount of permissible fore and aft movement. This has the advantage that the holes for the bolts do not need to be drilled prior to assembling with the vehicle and seat and indeed can be put in any suitable place depending on the particular vehicle and seat being manufactured.

The limits of fore and aft movement are determined by indentations 21 in the respective slides as shown in FIGS. 1 and 2.

The slide is locked in a selected position of adjustment by means of a locking plate 25 which is pivotally mounted on a pin 26 welded to the side of the outer channel 11 and having a forward extension 27 for an operating member 28 in the form of a cross piece extending below the front of the seat between similar fore and aft adjusters on either side of the seat 50 as shown in FIG. 6. At the rear the plate is bent around to provide a detent 28' which extends sideways into a notch 29 in the side wall of the outer channel 11 and into any one of a number of corresponding notches 31 spaced along the length of the side wall of the inner channel 12. It will be seen from FIG. 3 that the notches 31 are not in the part of the channel defining the ball race so that the balls do not limit the extent of the channel wall that is available for the notches 31.

The locking plate 25 defines an operating part for the independent assembly and is normally spring biassed by a coil spring 32 having one end acting through a slot in the member 28 against a notch 30 in the extension 27, one turn 34 round the pin 26, and the other end acting on a pin 33. The pin 33 is welded to the side plate of the channel 11 and passes through a slot 35 in the plate 25, the ends of which slot define the limits of movement of the plate between an engaged and a released position.

Thus to adjust the fore and aft position the extension 27 of the plate 25 is lifted so that the detent 28' moves below the notch 31 it is in, and then the seat is slid forward or backwards until the new desired position is reached when the extension 27 is released and the spring 32 returns the detent 28' into the nearest fresh notch 31 in the inner channel 12.

It can be seen from FIGS. 1 and 2 that the operating member 28 is tubular at its rear ends where it embraces the forward extension 27. The spring 32 is normally urged by its own resilience to lie in the notch 30 in the extension 27. When the member 28 is slid over the ends of the extension 27, ramps 49 on the members 28 lift the spring 32 out of the notch 30 until with further rearward sliding of the member 28 the spring can spring back into the slot in the top of the member 28 and into the notch 30 to hold the two components locked together. In this way the fore and aft slide assemblies do not need to be connected together until they are finally assembled on a seat and a car but can be packed separately for transport. The associated spring 32, notched extension 27 and the member 28, with its ramp 49 thus define a snap-on connection.

In an alternative adjustment mechanism (not shown) a locking plate can pivot about a vertical pin secured to the upper face of the outer channel 11 by an angular movement defined by movement of a second pin secured to the upper face of the channel 11 and a slot in the plate. The plate is folded down and has an inwardly extending detent for engaging the slots already described and the plate is normally urged into the engaged position by a helical tension spring. In this alternative arrangement release of the latch plate is by turning a release arm secured to the plate in a sideways direction.

The modulus of elasticity of the cold reduced mild steel which is the preferred metal for the channels 11 and 12 is chosen so that under the high loads expected to be experienced during a collision as the seat tends to be pulled away from the floor, the channels can deform so that instead of the point or line contact through the balls which gives a very high local loading and a danger of failure, there is substantially full metal to metal contact along the co-operating parts 45 and 46 of the channels as shown best in FIG. 3 so that the seat is held more securely to the floor without danger of local failure allowing the seat to be released.

The facility of collapse also assists manufacture by accommodating dimensional variations within a specified tolerance.

It will be seen from the arrows 47 in FIG. 5 that the direction of force through the ball bearing surface is approximately 45° to the horizontal and vertical when the slide is at normal load. This assists the parallel movement of the slides and is particularly suitable for bench seats which are usually operated from an off-center driver's position.

What we claim as our invention and desire to secure by Letters Patent is:

1. A fore and aft slide for a vehicle seat including relatively slidable inner and outer channels having tops and sides and rigid ball means disposed and rollable in tracks between the outer surfaces of the sides of the inner channel and the inner surfaces of the sides of the outer channel, the inner and outer channels being in contact in the absence of any vertical load on the seat, one of the channels being capable under a predetermined vertical load of deformation within the elastic modulus of the channel material to cause the channels to move out of contact with one another, there being a series of notches for a locking detent along one channel.

2. A fore and aft slide as claimed in claim 1, in which the channels have respective bearing surfaces which are closely spaced apart under the predetermined load but which make contact with each other along the length of the channels during the deformation under load in excess of the predetermined load.

3. A slide as claimed in claim 1 including fixing means for the channels in the tops of said channels in positions where there is no interference with the ball means.

4. A slide as claimed in claim 1 in which the ball means are in races defined by respective facing angles of the channels each defined by a vertical and a horizontal surface of one of the channels, the line of thrust through a ball from channel to channel being inclined to the horizontal and vertical.

5. A slide as claimed in claim 1 in which the ball means provide location between the channels in both horizontal and vertical directions.

6. A slide as claimed in claim 1 including sliding interlayers disposed between surfaces of the channels to establish the contact in the absence of any vertical load on the seat.

7. A slide as claimed in claim 1 in which one of the channels has stops pressed into its side for cooperating with the ball means to define limiting positions of the slide.

8. A slide as claimed in claim 1 in which the series of notches are arranged along the full length of the side of one channel.

9. A slide as claimed in claim 1 including a releasable latch for locking the slide in a chosen position of adjustment and a pivot pin for the latch fixed to a side of one channel.

10. A slide as claimed in claim 1 in which the said one channel having the notches has a part of its side projecting beyond the ball means from the top, the notches being in that part of its side.

11. A slide as claimed in claim 1 including a surface on the other channel against which the detent can bear when engaged in one of the notches.

12. An adjustable seat fixing in combination with a vehicle seat comprising two adjustment assemblies each constituting one side of the fixing, each assembly having an individual operating part pivotally mounted thereon about an axis transverse to the fore and aft axis of the seat for releasing the assembly for adjustment and a common manually-operable release member in the form of a rigid cross bar extending transversely wholly between the assemblies below the front of the seat and secured at its respective ends to the respective operating parts through snap-on connections, and being capable of downward bodily movement below the seat for releasing movement of both operating parts.

13. A seat fixing as claimed in claim 12 in which each adjustment assembly comprises two relatively slidable channels for permitting adjustment of the fore and aft position of the seat.

14. A seat fixing as claimed in claim 12 in which the ends of the release member and the operating parts are telescoped together, and respective springs extend through corresponding notches to latch them together.

* * * * *

UNITED STATES PATENT OFFICE
CERTIFICATE OF CORRECTION

Patent No. 3,685,872        Dated August 22, 1972

Inventor(s)   Frederick William Babbs

It is certified that error appears in the above-identified patent and that said Letters Patent are hereby corrected as shown below:

In the title page, please insert -- claims priority British Application No. 55477/68, filed November 22, 1968. --

Signed and sealed this 20th day of February 1973.

(SEAL)
Attest:

EDWARD M. FLETCHER, JR.
Attesting Officer

ROBERT GOTTSCHALK
Commissioner of Patents